(12) United States Patent
Kovacic et al.

(10) Patent No.: US 10,911,102 B2
(45) Date of Patent: Feb. 2, 2021

(54) RADIO-FREQUENCY IDENTIFICATION TRANSPONDER AND METHOD FOR DATA TRANSMISSION BY MEANS OF RADIO-FREQUENCY IDENTIFICATION TECHNOLOGY

(71) Applicant: STMicroelectronics International N.V., Schiphol (NL)

(72) Inventors: Kosta Kovacic, Orehova Vas (SI); Albin Pevec, Ljubljana (SI); Maksimiljan Stiglic, Maribor (SI)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 16/793,679

(22) Filed: Feb. 18, 2020

(65) Prior Publication Data

US 2020/0186200 A1    Jun. 11, 2020

Related U.S. Application Data

(60) Division of application No. 16/435,815, filed on Jun. 10, 2019, now Pat. No. 10,608,705, which is a (Continued)

(30) Foreign Application Priority Data

Jul. 21, 2015 (EP) .................................... 15177652

(51) Int. Cl.
*H04B 5/00* (2006.01)
*G06K 7/00* (2006.01)
(Continued)

(52) U.S. Cl.
CPC ......... *H04B 5/0068* (2013.01); *G06K 7/0008* (2013.01); *G06K 19/0715* (2013.01); *G06K 19/0723* (2013.01); *G06K 19/07749* (2013.01)

(58) Field of Classification Search
None
See application file for complete search history.

(56) References Cited

U.S. PATENT DOCUMENTS

2011/0274141 A1    11/2011    Jantunen et al.
2012/0269253 A1    10/2012    Daecke
(Continued)

FOREIGN PATENT DOCUMENTS

EP    2824612 A1    1/2015

OTHER PUBLICATIONS

International Search Report and Written Opinion for PCT/EP2016/066945 dated Oct. 24, 2016 (9 pages).

*Primary Examiner* — Carlos Garcia
(74) *Attorney, Agent, or Firm* — Crowe & Dunlevy

(57) ABSTRACT

An RFID transponder includes a coding and modulation unit that generates a transmission signal by modulating an oscillator signal with an encoded bit signal. During a first and a second time segment, the encoded bit signal assumes a first and a second logic level, respectively. The transmission signal includes a first signal pulse having a first phase within the first time segment and a second signal pulse having a second phase that is shifted with respect to the first phase by a predefined phase difference within the second time segment. The transmission signal is paused for a pause period between the first and the second signal pulse. The pause period is shorter than a mean value of a period of the first time segment and a period of the second time segment.

21 Claims, 1 Drawing Sheet

Related U.S. Application Data continuation of application No. 15/742,962, filed as application No. PCT/EP2016/066945 on Jul. 15, 2016, now Pat. No. 10,361,756.

(51) Int. Cl.
*G06K 19/07* (2006.01)
*G06K 19/077* (2006.01)

(56) References Cited

U.S. PATENT DOCUMENTS

2014/0341327 A1   11/2014   Raggam et al.
2017/0300723 A1   10/2017   Kovacic et al.

RADIO-FREQUENCY IDENTIFICATION TRANSPONDER AND METHOD FOR DATA TRANSMISSION BY MEANS OF RADIO-FREQUENCY IDENTIFICATION TECHNOLOGY

CROSS REFERENCE TO RELATED APPLICATIONS

This application is a division of U.S. application patent Ser. No. 16/435,815 filed Jun. 10, 2019, which is a continuation of U.S. application patent Ser. No. 15/742,962 filed Jan. 9, 2018, which is a national stage filing from PCT/EP2016/066945 filed Jul. 15, 2016, which claims priority from European Application for Patent No. 15177652.3 filed Jul. 21, 2015, the disclosures of which are incorporated by reference.

TECHNICAL FIELD

The invention relates to a radio-frequency identification (RFID) transponder, in particular to an active load modulation (ALM) RFID transponder and to a method for data transmission by means of RFID technology, in particular ALM RFID technology.

BACKGROUND

RFID technology is, for example, used for communication between an RFID transponder and an RFID reading device. To this end, magnetic coupling is established, for example, between an antenna of the RFID transponder and an antenna of the reading device. Communication is performed, for example, by means of radio-frequency (RF) fields with a frequency in the order of MHz, for example at 13.56 MHz.

Passive RFID transponders communicate to the reading device by means of passive load modulation. On the other hand, ALM RFID transponders communicate to the reading device by generating a signal synchronous to an incoming field from the reading device. To this end, an oscillator signal of the RFID transponder needs to be repeatedly synchronized with a reader signal depending on the incoming field.

In order to reduce space consumption, RFID transponders with very small dimensions are required. Consequently, also the antenna of the RFID transponder is required to be very small. A drawback of such a small antenna is a reduction of a possible operating range, that is a maximum possible distance between the RFID transponder and the reading device that still allows for communication. An RFID transponder with a small antenna size may achieve only a limited load modulation amplitude at the reader. According to industrial standards, the load modulation amplitude must be higher than corresponding threshold values. Consequently, a reduction of the antenna size is limited in existing transponders.

Furthermore, the synchronization of the oscillator signal and the reader signal may require additional time during which no data transmission from the RFID transponder to the reading device may be possible. Thus, existing RFID transponders may be limited to transmission protocols that further reduce the achievable load modulation amplitude.

There is a need in the art to provide an improved concept for an RFID transponder providing instances for synchronization while keeping a high load modulation amplitude.

SUMMARY

In an embodiment, a transmission signal is generated by an RFID transponder according to a protocol that implies a data transmission without silence when data transmission from the RFID transponder to a reading device is active. The transmission signal consists of sequences of signal pulses, wherein subsequent signal pulses of a given sequence feature a phase shift. Between such subsequent signal pulses featuring the phase shift, the transmission signal is paused.

In an embodiment, a radio-frequency identification (RFID) transponder is provided. The RFID transponder comprises a coding and modulation circuit designed to generate a transmission signal by modulating an oscillator signal with an encoded bit signal, the oscillator signal having an oscillator frequency. Therein, during a transmission period, the encoded bit signal assumes, during a first time segment of the transmission period, a first logic level and, during a second time segment of the transmission period, a second logic level being different from the first logic level.

Within the first time segment, the transmission signal comprises a first signal pulse featuring the oscillator frequency and a first phase depending on the first logic level. Within the second time segment, the transmission signal comprises a second signal pulse featuring the oscillator frequency and a second phase depending on the second logic level. The second phase is shifted with respect to the first phase by a predefined phase difference. Furthermore, the transmission signal is paused for a pause period between the first and the second signal pulse, wherein the pause period is shorter than a mean value of a period of the first time segment and a period of the second time segment. That is, the pause period is shorter than one half times the sum of the period of the first time segment and the period of the second time segment.

According to some implementations of the RFID transponder, the pause period is shorter than the first time segment and shorter than the second time segment.

According to several implementations of the RFID transponder, the first logic level corresponds to logic high and the second logic level corresponds to logic low or vice versa.

According to several implementations of the RFID transponder, the first phase corresponds to a phase of the oscillator signal.

In some implementations, the predefined phase difference is equal to 180° or approximately 180°.

According to several implementations of the RFID transponder, the predefined phase difference is generated by means of an inverter circuitry of the RFID transponder, for example of the coding and modulation circuit.

According to several implementations of the RFID transponder, the pause period is shorter than a sum of a period of the first signal pulse and a period of the second signal pulse.

According to several implementations of the RFID transponder, the pause period is shorter than or equal to a period of the first signal pulse.

According to several implementations of the RFID transponder, the pause period is shorter than or equal to a period of the second signal pulse.

According to several implementations of the RFID transponder, a value of the encoded bit signal is constant or approximately constant during each of the first and the second time segment.

According to several implementations of the RFID transponder, the RFID transponder is implemented as an active load modulation (ALM) transponder.

According to several implementations of the RFID transponder, the RFID transponder is implemented as a near field communication (NFC) transponder.

According to several implementations of the RFID transponder, the oscillator frequency is equal to or approximately equal to 13.56 MHz.

According to several implementations of the RFID transponder, the coding and modulation circuit is designed to generate the encoded bit signal based on a data bit signal, wherein the data bit signal represents data to be transmitted by the RFID transponder to a reading device.

According to several implementations of the RFID transponder, the coding and modulation circuit is designed to generate transmission signal such that the transmission signal is not paused for a period being longer than the first time segment or being longer than the second time segment when a data transmission from the RFID transponder to the reading device is active.

According to several implementations of the RFID transponder, the RFID transponder comprises an antenna system and a front end circuitry connected to the antenna system. The antenna system and the front end circuitry are configured to generate a transmission RF field based on the transmission signal.

The transmission RF field is, for example, detected by a reading device. In this way, data, in particular the data to be transmitted, may be transmitted from the RFID transponder to the reading device.

According to several implementations of the RFID transponder, the RFID transponder operates in accordance with an industrial standard. In some implementations, the RFID transponder operates in accordance with an industrial standard with respect to generating the encoded bit signal based on the data bit signal. The industrial standard may, for example, be a standard according to ISO/IEC 14443 Type A, ISO/IEC 14443 Type B, JIS.X.6319-4 or another suitable standard.

According to several implementations of the RFID transponder, wherein the coding and modulation circuit is designed to apply a predefined coding algorithm to the data bit signal for generating the encoded bit signal. The coding algorithm may comprise a Manchester coding algorithm.

According to some implementations of the RFID transponder, the encoded bit signal is given by the data bit signal encoded by means of a Manchester coding algorithm. Such implementations may, for example, correspond to implementations wherein the RFID transponder operates in accordance with the JIS.X.6319-4 standard.

According to several implementations of the RFID transponder, the coding and modulation circuit is designed to generate the encoded bit signal based on the data bit signal and a subcarrier signal, wherein the subcarrier signal is a binary clock signal with a subcarrier frequency being smaller than the oscillator frequency. The subcarrier frequency may, for example, be equal to or approximately equal to 847.5 MHz or 848 MHz.

According to several implementations of the RFID transponder, the encoded bit signal corresponds to the subcarrier signal with a phase, in particular a code phase, depending on a logic level of the data bit signal.

According to some implementations, the coding and modulation circuit is designed to generate the encoded bit signal by modulating the subcarrier signal depending on the data bit signal according to phase shift keying (PSK) in particular according to binary phase shift keying (BPSK). Such implementations may, for example, correspond to implementations wherein the RFID transponder operates in accordance with the ISO/IEC 14443 Type B standard.

According to several implementations of the RFID transponder, the encoded bit signal is generated to switch its value from the first logic level to the second logic level exactly once during the transmission period.

According to several implementations of the RFID transponder, the transmission period has a length corresponding to a total cycle number multiplied with a cycle period depending on the oscillator frequency. Further, the first signal pulse comprises a first cycle number of cycles, each having a length given by the cycle period and the second signal pulse comprises a second cycle number of cycles, each having a length given by the cycle period. The pause period has a length corresponding to a pause cycle number multiplied with the cycle period.

The total cycle number is equal to a sum of the first, the second and the pause cycle number. Each of the first, the second and the pause cycle number is equal to or smaller than one half of the total cycle number.

According to some implementations, the cycle period is given by an inverse or approximately by an inverse of the oscillator frequency.

According to several implementations of the RFID transponder, the RFID transponder further comprises a phase-locked loop circuit designed to generate the oscillator signal and to synchronize the oscillator signal and a reference signal during a lock period within the pause period.

According to several implementations of the RFID transponder, the RFID transponder further comprises an antenna system and a front end circuitry connected to the antenna system and configured to generate, during the pause period, a reader signal based on an RF field detected by the antenna system. The RFID transponder further comprises the phase-locked loop circuit being designed to generate the oscillator signal and to synchronize the oscillator signal and the reader signal during a lock period within the pause period. The RF field detected by the antenna system is, for example, generated by the reading device. In such implementations, the reference signal corresponds to the reader signal.

In some implementations, the phase-locked loop circuit is designed to generate the oscillator signal during the whole transmission period.

In some implementations, a frequency of the reader signal is equal or approximately equal to the oscillator frequency. In particular, the oscillator frequency may be determined by the frequency of the reader signal at least during the lock period.

According to several implementations of the RFID transponder, the phase-locked loop circuit is designed to synchronize the oscillator signal and the reader signal by ensuring a predefined constant phase relation between the oscillator signal and the reader signal during the lock period.

Ensuring the constant phase relation results in the oscillator frequency being equal or approximately equal to the reader frequency during the lock period.

According to some implementations of the RFID transponder, the phase-locked loop circuit is designed to operate in an unlocked mode at times outside of the lock period, in particular at times within the transmission period and outside of the lock period. Therein, the phase-locked loop circuit does not synchronize the oscillator signal and the reader signal when operating in the unlocked mode.

The unlocked mode may, for example, correspond to a free running mode of operation of the phase-locked loop circuit. In particular, during the unlocked mode, the phase-locked loop circuit may still generate the oscillator signal without synchronizing the oscillator signal and the reader signal. When the phase-locked loop circuit is synchronizing the oscillator signal and the reader signal, the oscillator signal is, for example, fed back from an output of the phase-locked loop circuit to an input stage of the phase-locked loop circuit. In contrast, during the unlocked mode, the feedback may, for example, be suspended, disconnected or interrupted.

According to several implementations of the RFID transponder, the RFID transponder further comprises a damping circuitry configured to attenuate the antenna system at least during a part of the pause period.

According to several implementations of the RFID transponder, the damping circuitry is configured to attenuate the antenna system during an attenuation period within the pause period, wherein the attenuation period precedes the lock period.

According to several implementations, the damping circuitry is implemented according to the teaching of Published PCT Application WO 2015/003870 A1, whose disclosure is included herewith in total by reference. For further details on the attenuation an the damping circuitry, it is referred to said document.

According to several implementations, a transmission frame comprises a plurality of transmission periods including the transmission period. The encoded bit signal and the transmission signal are generated in a periodic manner at least during the plurality of transmission periods. During each of the transmission periods the encoded bit signal has during a respective first time segment the first logic level and during a respective second time segment the second logic level.

During each of the transmission periods, the transmission signal comprises, within the respective first time segment, a respective first signal pulse having the oscillator frequency and the first phase. During each of the transmission periods, the transmission signal comprises, within the respective second time segment, a respective second signal pulse having the oscillator frequency and the second phase. During each of the transmission periods, the transmission signal is paused for a respective pause period between the respective first and the respective second signal pulse, the respective pause period being shorter than a mean value of a period of the respective first time segment and a period of the respective second time segment.

In such implementations, a variation of the load modulation amplitude may be consistent in different parts of the transmission frame. This may be an explicit or effective requirement for passing certification tests.

In an embodiment, a method for data transmission by means of RFID technology includes: generating a transmission signal by modulating an oscillator signal with an encoded bit signal, wherein the oscillator signal has an oscillator frequency. During a transmission period, the encoded bit signal assumes, during a first time segment of the transmission period, a first logic level and, during a second time segment of the transmission period, a second logic level being different from the first logic level.

Within the first time segment, the transmission signal comprises a first signal pulse featuring the oscillator frequency and a first phase depending on the first logic level. Within the second time segment, the transmission signal comprises a second signal pulse featuring the oscillator frequency and a second phase depending on the second logic level and being shifted with respect to the first phase by a predefined phase difference. The transmission signal is paused for a pause period between the first and the second signal pulse, the pause period being shorter than a mean value of a period of the first time segment and a period of the second time segment.

According to several implementations of the method, the pause period is shorter than the first time segment and shorter than the second time segment.

According to several implementations of the method, the method further comprises generating the encoded bit signal based on a data bit signal, wherein the data bit signal represents data to be transmitted.

According to several implementations of the method, the method further comprises detecting an RF field, generating, during the pause period, a reader signal based on the RF field and synchronizing the oscillator signal and the reader signal during a lock period within the pause period.

Further implementations of the method are readily derived from the various implementations and embodiments of the RFID transponder and vice versa.

BRIEF DESCRIPTION OF THE DRAWINGS

In the following, the invention is explained in detail with the aid of exemplary implementations by reference to the drawings. Components that are functionally identical or have an identical effect may be denoted by identical references.

Identical components and/or components with identical effects may be described only with respect to the figure where they occur first and their description is not necessarily repeated in subsequent figures.

In the drawings,

FIG. 1 shows an exemplary implementation of an RFID transponder according to the improved concept;

FIG. 2 shows signal sequences as a function of time occurring in an exemplary implementation of an RFID transponder according to the improved concept; and FIG. 3 shows signal sequences as a function of time occurring in a further exemplary implementation of an RFID transponder according to the improved concept.

DETAILED DESCRIPTION

Figure 1:
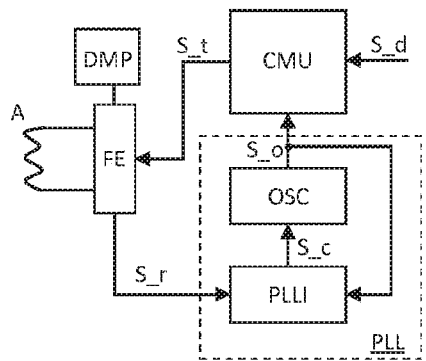

FIG. 1 shows an exemplary implementation of an RFID transponder. The RFID transponder comprises a front end circuitry FE, an antenna system A connected to the front end circuitry FE and a damping circuitry DMP connected to the front end circuitry FE and/or the antenna system A. The RFID transponder further comprises a phase-locked loop circuit PLL. The phase-locked loop circuit PLL comprises an input stage PLLI connected to the front end circuitry FE and an oscillator OSC connected to the input stage PLLI. The oscillator OSC may, for example, be implemented as a voltage controlled oscillator. The RFID transponder further comprises a coding and modulation circuit CMU connected to the oscillator OSC and to the front end circuitry FE.

The antenna system A may, for example, be configured to detect a radio-frequency (RF) field, for example generated by a reading device (not shown) communicating with the RFID transponder. The antenna system A and the front end circuitry FE may, for example, generate a reader signal S_r based on the detected RF field. The reader signal S_r may be supplied to the phase-locked loop circuit PLL, in particular to the input stage PLLI.

The oscillator OSC of the phase-locked loop circuit PLL may, for example, generate an oscillator signal S_o featuring an oscillator frequency. Depending on the mode of operation, the oscillator OSC may, for example, feedback the oscillator signal S_o to the input stage PLLI. In particular, the oscillator OSC may feedback the oscillator signal S_o to the input stage PLLI during a locked mode of operation of the phase-locked loop circuit PLL. The oscillator OSC may, for example, not feedback the oscillator signal S_o to the input stage PLLI during an unlocked mode of operation of the phase-locked loop circuit PLL.

Thus, the locked mode of operation may correspond to a synchronization mode of the phase-locked loop circuit PLL during which the oscillator signal S_o present at an output of the phase-locked loop circuit PLL is synchronized to the reader signal S_r present at an input of the phase-locked loop circuit PLL.

On the other hand, the unlocked mode of operation may correspond to a free running mode of the phase-locked loop circuit PLL during which the oscillator signal S_o present at an output of the phase-locked loop circuit PLL is not synchronized to the reader signal S_r.

When operating in the locked mode of operation, the input stage PLLI may, for example, compare the oscillator signal S_o to the reader signal S_r, in particular compare a frequency of the reader signal S_r to the oscillator frequency of the oscillator signal S_o and/or a phase of the reader signal S_r to a phase of the oscillator signal S_o. Based on the comparison, the input stage PLLI may, for example, generate a control signal S_c and supply it to the oscillator OSC.

During the locked mode of operation, the oscillator OSC may, for example, generate and/or adjust the oscillator signal S_o based on the control signal S_c in order to ensure a constant phase relation between the reader signal S_r and the oscillator signal S_o. During the unlocked mode of operation, the oscillator OSC may, for example, generate the oscillator signal S_o based on settings determined during the locked mode.

The damping circuitry DMP may, for example, be configured to attenuate the antenna system A during specific time periods, for example during an attenuation period. The damping circuitry DMP is, for example, implemented according to the teaching of Published PCT Application WO 2015/003870 A1.

The oscillator OSC supplies the oscillator signal S_o to the coding and modulation circuit CMU. Furthermore, the coding and modulation circuit CMU receives a data bit signal S_d, for example, from a further component (not shown) of the RFID transponder. The data bit signal S_d represents, for example, data to be transmitted by the RFID transponder to the reading device. Based on the data bit signal S_d, the coding and modulation circuit CMU may generate, for example, an encoded bit signal S_e.

For generating the encoded bit signal S_e, the coding and modulation circuit CMU may, for example, apply a predefined coding algorithm, for example a Manchester coding algorithm, to the data bit signal S_d. Alternatively or in addition, the coding and modulation circuit CMU may generate the encoded bit signal S_e based on the data bit signal S_d and a subcarrier signal. The subcarrier signal may, for example, be a binary clock signal with a subcarrier frequency being smaller than the oscillator frequency.

The coding and modulation circuit CMU is further configured to generate a transmission signal S_t based on the encoded bit signal S_e, in particular by modulating the oscillator signal S_o with the encoded bit signal S_e.

Figure 2:
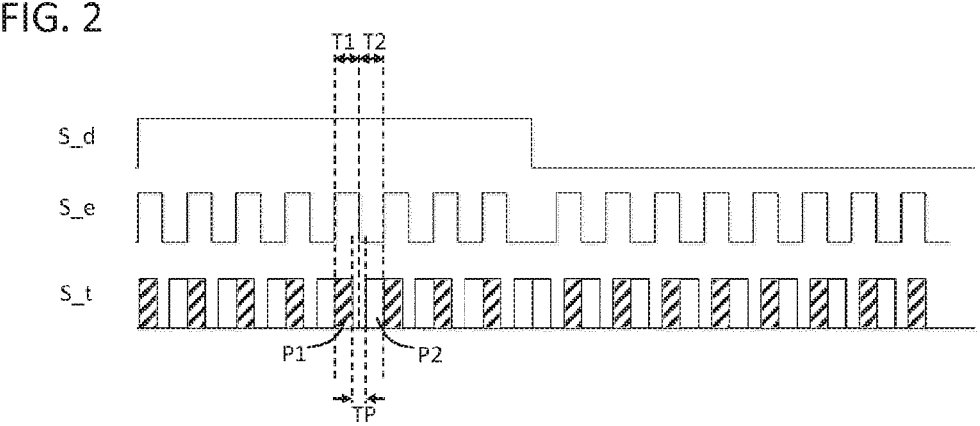
Figure 3:
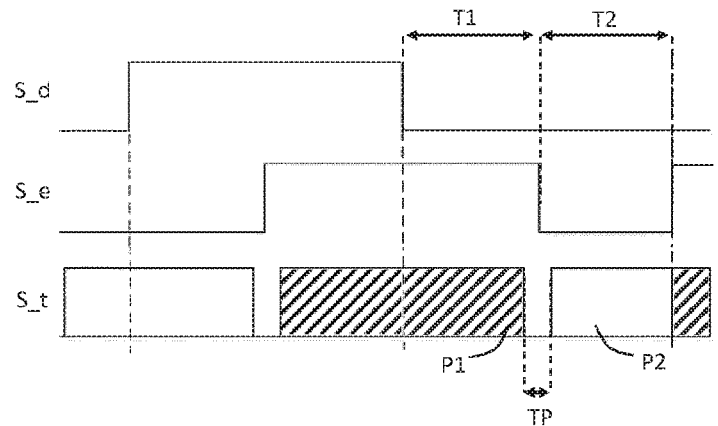

For further details regarding the operation of the RFID transponder, in particular the phase-locked loop circuit PLL and the coding and modulation circuit CMU, in particular on the generation of the transmission signal S_t, it is referred to FIGS. 2 and 3.

The coding and modulation circuit CMU supplies the transmission signal S_t to the front end circuitry FE. Based on the transmission signal S_t, the front end circuitry FE and the antenna system A may, for example, generate a transmission RF field that may consequently be detected by the reading device.

FIG. 2 shows signal sequences as a function of time occurring in an exemplary implementation of an RFID transponder, for example an RFID transponder as shown in FIG. 1. In particular, the data bit signal S_d, the encoded bit signal S_e and the transmission signal S_t are shown as a function of time.

In the example of FIG. 2, the RFID transponder may, for example, operate in accordance with the industrial standard ISO/IEC 14443, in particular ISO/IEC 14443 Type B. In particular, the generation of the encoded bit signal S_e may be performed in accordance with said standard. According to the ISO/IEC 14443 Type B standard, a data transmission rate may, for example, correspond to 106 kbit/s.

The data bit signal S_d first assumes a logic high value and then assumes a logic low value. A bit period of the data bit signal S_d corresponds to a time period representing an individual bit of data to be transmitted. That is, the bit period corresponds to a minimum time period during which the data bit signal S_d remains constant.

In the example of FIG. 2, the coding and modulation circuit CMU generates the encoded bit signal S_e based on the data bit signal S_d and the subcarrier signal. The subcarrier signal may, for example, correspond to a binary clock signal. That is, the subcarrier signal may switch between a first logic level, for example the logic high value, and a second logic level, for example the logic low value, at the subcarrier frequency. Whenever the data bit signal S_d assumes the logic high value, the encoded bit signal S_e may correspond to the subcarrier signal. On the other hand, whenever the data bit signal S_d assumes the logic low value, the encoded bit signal S_d may corresponds to a phase shifted version of the subcarrier signal. In the shown example, the encoded bit signal S_e undergoes a phase shift of 180° or approximately 180° when the data bit signal S_d switches from the logic high value to the logic low value or vice versa. The described generation of the encoded bit signal S_e corresponds, for example, to a BPSK protocol.

The transmission signal S_t is generated by the coding and modulation circuit CMU by modulating the oscillator signal with the encoded bit signal S_e. A transmission period is, for example, formed by a first time segment T1 and a second time segment T2 following the first time segment T1. A period of the first time segment T1 may be equal to or may be different from a period of the second time segment T2. During the first time segment T1, the encoded bit signal S_e assumes the first logic level and during the second time segment T2, the encoded bit signal S_e assumes the second logic level.

The transmission signal S_t comprises a first signal pulse P1 during the first time segment T1. The first signal pulse P1 may, for example, begin together with the first time segment T1 and may end before the first time segment T1 ends. The first signal pulse P1 comprises for example a first cycle number of cycles, each of the cycles having a length given by or approximately given by a cycle period. The cycle period depends on the oscillator frequency and is, for example, given or approximately given by an inverse of the oscillator frequency. The first signal pulse P1 features a first phase depending on the first logic level. The first phase may be equal or may be different to a phase of the oscillator signal S_o.

The transmission signal S_t comprises a second signal pulse P2 during the second time segment T2. The second signal pulse P2 may, for example, begin after the beginning of the second time segment T2 and may end together with the second time segment T2. The second signal pulse P2 comprises, for example, a second cycle number of cycles, each of the cycles having a length given by or approximately given by the cycle period. The second signal pulse P2 features a second phase depending on the second logic level. In particular, the second phase is shifted with respect to the first phase by a predefined phase difference. The predefined phase difference may, for example, be 180° or approximately 180° or another value.

The transmission signal S_t is paused for a pause period TP between the first signal pulse P1 and the second signal pulse P2. In particular, the pause period TP may begin before the first time segment T1 has ended and the pause period TP may end after the second time segment T2 has begun. The pause period TP has, for example, a length corresponding to a pause cycle number times the cycle period. The pause period TP is shorter than a mean value of the period of the first time segment T1 a period of the second time segment T2. For example, in case the period of the first time segment T1 is equal to the time period of the second time segment T2, the pause period TP may be shorter than the first time segment T1 and shorter than the second time segment T2.

The transmission period has, for example, a length corresponding to a total cycle number times the cycle period. The total cycle number is, for example, given by a sum of the first, the second and the pause cycle number. For example, each of the first cycle number, the second cycle number and the pause cycle number may be smaller than one half of the total cycle number.

For example, the oscillator frequency may be given by or approximately given by 13.56 MHz, while the subcarrier frequency may, for example, be given by or approximately given by 848 kHz.

The total cycle number may, for example, be equal to 16. The pause cycle number may, for example, lie in the interval [1, 7], for example in the interval [3, 7], for example in the interval [4, 6]. In case the pause cycle number is given by an even number, the first and the second cycle number may be equal to each other. In case the pause cycle number is given by an odd number, the first and the second cycle number of for example different by 1. For example, the pause cycle number may be equal to 5. Then, the first cycle number may be equal to 5 and the second cycle number may be equal to 6 or vice versa.

During the pause period TP, the phase-locked loop circuit PLL may, for example, synchronize the oscillator signal S_o and the reader signal S_r. In particular, the synchronization may be performed during a lock period within the pause period TP. In particular, the lock period may be shorter than the pause period TP. During the lock period, the phase-locked loop circuit PLL operates in the locked mode of operation.

The oscillator signal S_o and the reader signal S_r may, for example, be synchronized by ensuring a predefined constant phase relation between the oscillator signal S_o and the reader signal S_r.

Furthermore, the damping circuitry DMP is configured to attenuate the antenna system A during an attenuation period within the pause period TP. Therein, the attenuation period precedes the lock period. Consequently, during the pause period first the antenna system A may be attenuated by means of the damping circuitry DMP. And afterwards, the oscillator signal S_o and the reader signal S_r are synchronized during the lock period. By attenuating the antenna system A before the synchronization, the synchronization may be improved.

The generation of the transmission signal S_t as described above may be continuously repeated in a periodic manner. As depicted, the depicted transmission period may, for example, lie within the period during which the data bit signal S_d is logic high. However, as can be seen in FIG. 2, the transmission signal S_t is generated in an analogous way also when the data bit signal S_d is logic low. In particular the shaded frames in the transmission signal S_t represent signal pulses corresponding to the first signal pulse P1 and the blank frames in the transmission signal S_t represent signal pulses corresponding to the second signal pulse P2. Each signal pulse corresponding to the first signal pulse P1 is separated from a signal pulse corresponding to the second signal pulse P2 by a respective pause period. Within each of the respective pause periods, the oscillator signal S_o may be synchronized to the reader signal S_r as described above.

FIG. 3 shows signal sequences as a function of time occurring in a further exemplary implementation of an RFID transponder according to the improved concept, for example an RFID transponder as shown in FIG. 1. In particular, the data bit signal S_d, the encoded bit signal S_e and the transmission signal S_t are shown as a function of time.

In the example of FIG. 3 the RFID transponder may, for example, operate in accordance with the industrial standard JIS.X.6319-4. In particular, the generation of the encoded bit signal S_e is performed in accordance with said standard.

The data bit signal S_d first assumes the logic low value, then assumes the logic high value and then again assumes the logic low value.

In the example of FIG. 3, the encoded bit signal S_e is given by the data bit signal S_d encoded by using a Manchester coding algorithm. In particular, a subcarrier signal is not used for generating the encoded bit signal S_e. In the shown example, the encoded bit signal S_e may assume the first logic level, for example the logic high value, during a first half of a bit period whenever the data bit signal S_d is logic low. The encoded bit signal may assume the second logic level, for example the logic low value, during a second half of the bit period whenever the data bit signal S_d is logic low. On the other hand, whenever the data bit signal is logic high, the encoded bit signal may assume the second logic level during the first half of the bit period and the first logic level during the second half of the bit period. Alternatively, another type of Manchester coding algorithm or another coding algorithm may be used analogously.

In a similar manner as described with respect to FIG. 2, the transmission signal S_t is generated by the coding and modulation circuit CMU by modulating the oscillator signal with the encoded bit signal S_e. A transmission period is, for example, formed by a first time segment T1 and a second time segment T2 following the first time segment T1. During the first time segment T1, the encoded bit signal S_e assumes the first logic level and during the second time segment T2, the encoded bit signal S_e assumes the second logic level.

As described above with respect to FIG. 2, the transmission signal S_t comprises the first signal pulse P1 during the first time segment T1 and the second signal pulse P2 during the second time segment T2, wherein the second phase of the second signal pulse P2 is shifted with respect to the first phase of the first signal pulse by the predefined phase difference.

As in the example of FIG. 2, also in FIG. 3 the transmission signal S_t is paused for the pause period TP between the first signal pulse P1 and the second signal pulse P2.

For example, the oscillator frequency may be given by or approximately given by 13.56 MHz, while the bit period may, for example, correspond to a data transmission rate in the order of several hundreds of kbit/s, for example between 200 kbit/s and 400 kbit/s. Consequently, the total cycle number may, for example, lie in the order of several tens or hundreds. For example, the total cycle number may lie within the interval [25, 150], for example within the interval [30, 70].

In analogy to what has been described with respect to FIG. 2, the phase-locked loop circuit PLL may, for example, synchronize the oscillator signal S_o and the reader signal S_r during the pause period TP, in particular during the lock period, during which the phase-locked loop circuit PLL operates in the locked mode of operation. The damping circuitry DMP may attenuate the antenna system A during the attenuation period.

Due to the generation of the transmission signal S_t as described in FIGS. 2 and 3, the oscillator signal S_o may be repeatedly synchronized with the reader signal S_r and at the same time an average signal value of the transmission signal S_t remains high leading to an improved load modulation amplitude. Consequently, the size of the antenna system A may be reduced while the load modulation amplitude still remains high enough to fulfill standard requirements.

REFERENCE NUMERALS

A antenna system
FE front end circuitry
PLL phase-locked loop circuit
PLLI input stage
OSC oscillator
CMU coding and modulation circuit
DMP damping circuitry
T1, T2 time segments
TP pause period
P1, P2 signal pulses
S_t transmission signal
S_d data bit signal
S_o oscillator signal
S_c control signal
S_r reader signal
S_e encoded bit signal

The invention claimed is:

1. A radio frequency identification (RFID) transponder, comprising:
a coding and modulation circuit configured to generate a transmission signal during a transmission period by modulating an oscillator signal with an encoded bit signal, the encoded bit signal having, during a first time segment of the transmission period, a first logic level and having, during a second time segment of the transmission period, a second logic level different from the first logic level;
wherein the transmission period has a length corresponding to a total cycle number multiplied with a cycle period depending on the frequency of the oscillator signal; and
wherein the transmission signal comprises:
within the first time segment, a first signal pulse comprising a first cycle number of cycles, each cycle having a length given by the cycle period; and
within the second time segment, a second signal pulse comprising a second cycle number of cycles, each cycle having a length given by the cycle period; and
wherein the coding and modulation circuit is further configured to pause the transmission signal for a pause period between the first signal pulse and the second signal pulse, the pause period having a length corresponding to a pause cycle number multiplied with the cycle period.

2. The RFID transponder according to claim 1, wherein the coding and modulation circuit is further configured to generate the encoded bit signal based on a data bit signal, wherein the data bit signal represents data to be transmitted by the RFID transponder to a reading device.

3. The RFID transponder according to claim 2, wherein the coding and modulation circuit is further configured, for generating the encoded bit signal, to apply a coding algorithm to the data bit signal.

4. The RFID transponder according to claim 2, wherein the coding and modulation circuit is further configured to generate the encoded bit signal based on the data bit signal and on a subcarrier signal, wherein the subcarrier signal is a binary clock signal with a subcarrier frequency being smaller than the frequency of the oscillator signal.

5. The RFID transponder according to claim 4, wherein the encoded bit signal corresponds to the subcarrier signal with a phase depending on a logic level of the data bit signal.

6. The RFID transponder according to claim 1, wherein the encoded bit signal is generated to have a value that switches from the first logic level to the second logic level exactly once during the transmission period.

7. The RFID transponder according to claim 1, wherein:
the total cycle number is equal to a sum of the first cycle number, the second cycle number and the pause cycle number; and
each of the first cycle number, the second cycle number and the pause cycle number is equal to or smaller than one half of the total cycle number.

8. The RFID transponder according to claim 1, further comprising:
an antenna;
a front end circuit connected to the antenna and configured to generate, during the pause period, a reader signal based on a radio-frequency field detected by the antenna; and
a phase-locked loop circuit configured to generate the oscillator signal and to synchronize the oscillator signal and the reader signal during a lock period within the pause period.

9. The RFID transponder according to claim 8, wherein the phase-locked loop circuit is configured to synchronize the oscillator signal and the reader signal to have constant phase relationship therebetween during the lock period.

10. The RFID transponder according to claim 8, wherein the phase-locked loop circuit is configured to operate in an unlocked mode at times outside of the lock period such that the oscillator signal and the reader signal are not synchronized during the unlocked mode.

11. The RFID transponder according to claim 8, further comprising a damping circuit configured to attenuate the antenna at least during a part of the pause period.

12. The RFID transponder according to claim 1, wherein the damping circuit is configured to attenuate the antenna during an attenuation period within the pause period, said attenuation period preceding the lock period.

13. The RFID transponder according to claim 1, wherein the pause period begins before the first time segment has ended and wherein the pause period ends after the second time segment has begun.

14. A method for data transmission using radio frequency identification (RFID) technology, the method comprising:
generating a transmission signal by modulating an oscillator signal with an encoded bit signal, the oscillator signal having a frequency;
wherein, during a transmission period, the encoded bit signal has, during a first time segment of the transmission period, a first logic level and has, during a second time segment of the transmission period, a second logic level being different from the first logic level;
wherein the transmission period has a length corresponding to a total cycle number multiplied with a cycle period depending on the frequency of the oscillator signal; and
wherein the transmission signal:
comprises, within the first time segment, a first signal pulse comprising a first cycle number of cycles, each cycle having a length given by the cycle period;
comprises, within the second time segment a second signal pulse comprising a second cycle number of cycles, each cycle having a length given by the cycle period; and
is paused for a pause period between the first signal pulse and the second signal pulse, the pause period having a length corresponding to a pause cycle number multiplied with the cycle period.

15. The method according to claim 14, further comprising generating the encoded bit signal based on a data bit signal, wherein the data bit signal represents data to be transmitted.

16. The method according to claim 15, wherein generating the encoded bit signal comprises applying a coding algorithm to the data bit signal.

17. The method according to claim 15, wherein generating the encoded bit signal comprises generating the encoded bit signal based on the data bit signal and on a subcarrier signal, wherein the subcarrier signal is a binary clock signal with a subcarrier frequency being smaller than the frequency of the oscillator signal.

18. The method according to claim 17, wherein the encoded bit signal corresponds to the subcarrier signal with a phase depending on a logic level of the data bit signal.

19. The method according to claim 14, further comprising:
detecting a radio-frequency field;
generating, during the pause period, a reader signal based the radio-frequency field; and
synchronizing the oscillator signal and the reader signal during a lock period within the pause period.

20. The method according to claim 14 wherein the encoded bit signal is generated to have a value that switches from the first logic level to the second logic level exactly once during the transmission period.

21. The method according to claim 14, wherein:
the total cycle number is equal to a sum of the first cycle number, the second cycle number and the pause cycle number; and
each of the first cycle number, the second cycle number and the pause cycle number is equal to or smaller than one half of the total cycle number.

* * * * *